(12) United States Patent
Pisharodi

(10) Patent No.: US 12,465,537 B2
(45) Date of Patent: Nov. 11, 2025

(54) SELF-CLEANING AIR FLOW FOR AIR-CONDITIONED FACILITIES

(71) Applicant: Madhavan Pisharodi, Brownsville, TX (US)

(72) Inventor: Madhavan Pisharodi, Brownsville, TX (US)

(73) Assignee: PERUMALA HOLDINGS, LLC, Brownsville, TX (US)

( * ) Notice: Subject to any disclaimer, the term of this patent is extended or adjusted under 35 U.S.C. 154(b) by 0 days.

(21) Appl. No.: 18/896,765

(22) Filed: Sep. 25, 2024

(65) Prior Publication Data

US 2025/0009582 A1    Jan. 9, 2025

Related U.S. Application Data

(63) Continuation-in-part of application No. 18/328,463, filed on Jun. 2, 2023, now Pat. No. 12,194,206.
(Continued)

(51) Int. Cl.
*F24F 3/167*    (2021.01)
*A61G 10/02*    (2006.01)
(Continued)

(52) U.S. Cl.
CPC .............. *A61G 10/02* (2013.01); *F24F 3/167* (2021.01); *F24F 8/108* (2021.01); *F24F 8/22* (2021.01)

(58) Field of Classification Search
None
See application file for complete search history.

(56) References Cited

U.S. PATENT DOCUMENTS 3,124,903 A * 3/1964 Truhan .................. A01G 9/246
                                                              47/17
3,721,072 A    3/1973 Miller
(Continued)

FOREIGN PATENT DOCUMENTS

CN           112378028 A  *  2/2021 .............. F24F 11/72

OTHER PUBLICATIONS

Document titled "A Method and Device for Separating and Killing Organism in Air", machine translation of CN 112378028 A provided by Clarivate, original document published Feb. 19, 2021 (Year: 2021).*

(Continued)

*Primary Examiner* — Holly Kipouros
(74) *Attorney, Agent, or Firm* — D'Ambrosio & Menon, PLLC; Usha Menon

(57) ABSTRACT

An air flow delivery system for delivering conditioned air to an enclosure housing infectious disease patients, includes: (a) an air intake pipe having a first bidirectional valve therein, wherein when the bidirectional valve is in an open state, ambient air enters the enclosure; (b) an air handler, the air handler coupled to the air intake pipe; and (c) an air supply duct installed within at least one wall of the enclosure, wherein the air supply duct delivers conditioned air from the air handler to one or more air supply vents positioned at or near a bottom surface of the enclosure. The enclosure is selected from a group consisting of a pavilion, a building, a room, a nursing home, an airplane, a vehicle, a train, a ship, a critical care unit in a hospital, and a free-standing, mobile enclosure.

17 Claims, 13 Drawing Sheets

Related U.S. Application Data

(60) Provisional application No. 63/586,322, filed on Sep. 28, 2023.

(51) Int. Cl.
  *F24F 7/10* (2006.01)
  *F24F 8/108* (2021.01)
  *F24F 8/22* (2021.01)

(56) References Cited

U.S. PATENT DOCUMENTS

| | | | |
|---|---|---|---|
| 3,773,044 | A | 11/1973 | Wallace |
| 3,850,170 | A | 11/1974 | Cox |
| 4,580,556 | A | 4/1986 | Kondur |
| 4,742,760 | A | 5/1988 | Horstman |
| 5,656,242 | A | 8/1997 | Morrow et al. |
| 7,185,510 | B2 | 3/2007 | Lee et al. |
| 8,336,821 | B2 | 12/2012 | Shell et al. |
| 8,674,322 | B2 | 3/2014 | Kohler |
| 11,052,169 | B1 | 7/2021 | Pisharodi |
| 2006/0057020 | A1 | 3/2006 | Tufo |
| 2006/0263276 | A1 | 11/2006 | Pattee |
| 2008/0112845 | A1 | 5/2008 | Dunn |
| 2008/0173178 | A1 | 7/2008 | Metteer |
| 2010/0150793 | A1 | 6/2010 | Chan |
| 2011/0286167 | A1 | 11/2011 | Winkler |
| 2012/0128539 | A1 | 5/2012 | Gross et al. |
| 2012/0301363 | A1 | 11/2012 | Kim et al. |
| 2016/0001108 | A1 | 1/2016 | Zhou et al. |
| 2017/0341762 | A1 | 11/2017 | Breigenzer |
| 2018/0250430 | A1 | 9/2018 | Machovina et al. |
| 2019/0009912 | A1 | 1/2019 | Matsui |
| 2021/0346563 | A1* | 11/2021 | Pisharodi ............ F24F 3/16 |
| 2022/0240458 | A1* | 8/2022 | Breza ............... A01G 7/045 |
| 2022/0265888 | A1* | 8/2022 | Jarrell .............. A61L 9/20 |

OTHER PUBLICATIONS

'How a packaged system works' (Goodman) Jul. 29, 2016, [online] retrieved from <URL: https://web.archive.org/web/20160729193422/ https://www.goodmanmfg.com/resources/heating-cooling-101/how-a-packaged-system-works>.

Hankaniemi et al., Vaccine, vol. 37, Issue 40, pp. 5962-5971, (Year: 2019).

'UVC disinfects SARS CoV 2 by induction of viral genome damage without apparent effects on viral morphology and proteins' (Lo) Jul. 5, 2021, [online] retrieved from <URL: https://doi.org/10.1038/s41598-021-93231-7>.

'UV Inactivation of Rotavirus and Tulane Virus Targets Different Components of the Virions' (Araud) Feb. 3, 2020, [online] retrieved from <URL: https://doi.org/10.1128/AEM.02436-19.>.

'Irradiation of UVC LED at 277 nm inactivates coronaviruses in association to photodegradation of spike protein' (Ong) Oct. 17, 2022, [online] retrieved from <URL: https://doi.org/10.1016/j.heliyon.2022.e11132>.

'Ultraviolet A light effectively reduces bacteria and viruses including coronavirus' (Rezale) Jul. 16, 2020, [online] retrieved from <URL: https://doi.org/10.1371/journal.pone.0236199>.

'UVC-based photoinactivation as an efficient tool to control the transmission of coronaviruses' (Bhardwaj) Jun. 16, 2021, [online] retrieved from <URL: https://doi.org/10.1016/j.scitotenv.2021.148548>.

'UV C irradiation is highly efective in inactivating SARS CoV 2 replication' (Biasin) Mar. 18, 2021, [online] retrieved from <URL: https://doi.org/10.1038/s41598-021-85425-w>.

* cited by examiner

SELF-CLEANING AIR FLOW FOR AIR-CONDITIONED FACILITIES

CROSS REFERENCE TO RELATED APPLICATIONS

This application is a non-provisional application of and claims priority to U.S. Provisional Patent Application Ser. No. 63/586,322 filed on Sep. 28, 2023. This application also claims priority to and is a continuation in part of U.S. Ser. No. 18/328,463 filed on Jun. 2, 2023. The entire disclosures of these patent applications are part of the disclosure of the present application and are hereby incorporated by reference in their entireties.

FIELD OF THE INVENTION

Embodiments of the invention relate generally to a system for providing clean air to persons infected with a contagious disease, and in particular to a system for providing a disinfected airflow to such persons.

BACKGROUND

History has not been kind to individuals with infectious diseases or suspected of having infectious diseases. The general perception is that infections are self-inflicted and that in the interests of society at large, it is more important to isolate these individuals to protect others from being infected. Too often this allowed society to treat individuals with infections with disrespect and cruelty. Such thinking allowed society to segregate leper colonies from the rest of the population in the Middle Ages. Similar measures were used throughout the centuries for individuals suffering from deadly or disfiguring diseases that were contagious or merely suspected to be so. More recently, scientists have labeled this segregation "source-prevention". Source prevention does not take into account the safety of the individuals who are deemed to be the source of the infection. For instance, if a patient infected with the SARS-CoV-2 virus is forced to wear a face mask, it could have deadly consequences because of the possibility of the patient re-inhaling the virus trapped in their mask. However, this risk is considered irrelevant or minimal since it prevents other individuals from being exposed to the virus. As such, there is an unmet need to effectively treat people with serious infections, especially the ones that are contagious, while preserving their dignity and ensuring that they are not re-infected.

Heating, ventilating and air conditioning (HVAC) systems are installed in confined spaces in order to heat/cool the confined spaces. A conventional central or split HVAC/air conditioning system 100 for a residential or commercial space, is shown in FIG. 1. Air that gets into the room is generally recirculated by the HVAC system. In a conventional airflow system, a supply vent is positioned on or substantially near the ceiling to deliver hot/cool air. The air is then circulated in the room. The circulated air/used air leaves the room through return vents which are also located on or substantially near the ceiling. Hot air rises while cold air sinks. The hot air in the room tries to go up towards the ceiling. Because of this conventional arrangement, air circulation is naturally more powerful close to the ceiling and gets weaker and cooler as it goes down towards the floor (as shown in FIG. 1). This leaves cold, dry, stagnant air in the lower part of the room where people usually move around. Only a portion of circulated/used air leaves the room through return vents located on the ceiling leaving the cold, dry air in the lowermost part of the room stagnant resulting in an ineffective air conditioning system. This air can go round and round in the room without ever getting recycled (as shown in FIG. 1). Unfortunately, cold, dry, stagnant air is ideal for airborne pathogens such as viruses (e.g. coronavirus), bacteria, and the like to remain infective.

Conventional central air conditioning systems include an air handler (usually located in an attic or basement of a residential space) and a condenser (usually located outside the residential space). Air handlers are devices that circulate conditioned air—that is, warmed or cooled air—throughout the space being air conditioned. The system 100 includes a supply vent and a return vent both positioned on or substantially near the ceiling to deliver hot/cold air to the space and to discharge the "used air" out of the space. Hot air that is circulated normally rises to the ceiling which causes the cold air to sink to the lower part of the space causing it to stagnate the lower part of the room. In cold climates when a heater is turned on, the hot air coming through the supply vent traverses only close to the ceiling. Thus, in conventional air conditioning systems, more time and energy is required to heat the space because of the resistance for the hot air to go down towards the floor, leaving cold stagnant, dry air in the lower regions of the room. This is an avoidable waste of energy. Therefore, there is a need for improved air conditioning systems that deliver clean and disinfected air.

SUMMARY OF THE DISCLOSURE

An objective of the present invention is to ensure treatment of persons with an infectious disease in a compassionate manner. In one or more embodiments, instead of merely isolating such infected individuals, just for the purpose of source prevention to protect others, these individuals can be protected with additional structural measures that allow them to overcome their infections faster and with better health outcomes.

According to an embodiment, infectious individuals can be protected and treated by creating dedicated, disinfected enclosures that can house and treat these individuals as individuals having special care requirements rather than seeing them as liabilities. Such enclosures can be equipped with a plurality of mechanisms, namely, a self-cleaning air flow and an air conditioning system equipped with safe, reliable, and protective in-flow UV-C (or UVC) disinfection and specialized filtration systems to purify and disinfect the air supply to such patients; a specialized water supply providing water that is disinfected with pre-determined maximum, safe UVC concentration levels; enforcing measures for healthcare providers and other individuals entering and leaving the pavilion to follow prevention measures that are similar to virology level I or II laboratories including where such individuals are provided with personal protection biological devices (PPBD); ventilators, anesthesia machine, and other similar units equipped with UVC disinfection; the judicious use of antibiotics to prevent the development and spread of antibiotic resistant organisms; and any other available prevention measures. In lieu of blame and punishment, the provision of efficient treatment in such specialized facilities can prevent major disease outbreaks in any localized area from developing into epidemics or pandemics.

Healthcare organizations, governmental agencies, etc., including the World Health Organization can use embodiments of the present invention, such as, mobile unit enclosures, in order to isolate and protect new infectious outbreaks on site. This can also prevent localized outbreaks from turning into epidemics and pandemics.

According to an embodiment, an air flow delivery system for delivering conditioned air to an enclosure housing infectious disease patients, includes: (a) an air intake pipe having a first bidirectional valve therein, wherein when the bidirectional valve is in an open state, ambient air enters the enclosure; (b) an air handler, the air handler coupled to the air intake pipe; and (c) an air supply duct installed within at least one wall of the enclosure, wherein the air supply duct delivers conditioned air from the air handler to one or more air supply vents positioned at or near a bottom surface of the enclosure. The air intake pipe can include a filter and a fan therein. The enclosure is selected from a group consisting of a pavilion, a building, a room, a nursing home, an airplane, a vehicle, a train, a ship, a critical care unit in a hospital, and a free-standing, mobile enclosure.

In one embodiment, a first end of the air supply duct is coupled to the air handler and a second end of the air supply duct is coupled to a perimeter air duct, wherein the perimeter air duct extends around the perimeter of the bottom surface of the enclosure. The one or more air supply vents are arranged along the perimeter duct. The system can also include one or more return vents located at or proximal to the ceiling of the enclosure. The system further includes a return duct for routing used air from the enclosure, wherein the return vent is connected to the one or more return vents. The return duct further comprises a pair of bi-directional valves. The valves disclosed herein can be actuated using conventional techniques to move between an open or closed state/position. When a first valve is moved to an open position, it allows used air to re-enter the air handler, and wherein when the first valve is moved to a closed position, it blocks air from re-entering the air handler.

In another embodiment, the system further comprises a disinfection unit, wherein the disinfection unit is configured to emit ultraviolet-C germicidal light, and wherein the disinfection unit is coupled to the air handler. A first end of the air supply duct is coupled to the disinfection unit while a second end of the air supply duct is coupled to a perimeter air duct, wherein the perimeter air duct extends around the perimeter of the bottom surface of the enclosure, and the one or more air supply vents are arranged along the perimeter duct.

In another embodiment, the air supply duct further comprises a plurality of duct branches, and wherein each duct branch terminates in an air supply vent. The system can further include a plurality of fans, and wherein each fan is coupled to an air supply vent.

In yet another embodiment, an air flow delivery system for delivering conditioned air to an enclosure, comprises: an air intake pipe having a first bidirectional valve therein, wherein when the bidirectional valve is in an open state, ambient air enters the enclosure; a disinfection unit, wherein the disinfection unit is coupled to the air intake pipe; an air handler, the air handler coupled to the disinfection unit; and an air supply duct installed within at least one wall of the enclosure, wherein the air supply duct delivers conditioned and disinfected air from the air handler to one or more air supply vents positioned at or near a bottom surface of the enclosure. At least one air supply duct is configured to deliver conditioned and disinfected air to adjacent first and second rooms separated by a partition or a wall. The at least one air supply duct can be bifurcated, and wherein a first branch of the bifurcated duct is configured to deliver conditioned and disinfected air to the first room and a second branch of the bifurcated duct is configured to deliver conditioned and disinfected air to the second room.

In yet another embodiment, an air flow delivery system for delivering conditioned air to an enclosure, comprises an air intake pipe having a first bidirectional valve therein, wherein when the bidirectional valve is in an open state, ambient air enters the enclosure; a disinfection unit, wherein the disinfection unit is coupled to the air intake pipe; an air handler, the air handler coupled to the disinfection unit; and one or more air supply ducts, wherein each air supply duct is configured to deliver conditioned and disinfected air from the air handler to one or more air supply vents located along or proximal to a ceiling of the enclosure. A return air duct can be installed within one or more walls of the enclosure, wherein the return air duct comprises a plurality of branches. Each of the branches extends through the walls of the enclosure. Each branch terminates in a vent/opening at or proximal to the floor of the enclosure. Exhaled/used air is routed through the vents/openings to the return air duct.

In one or more embodiments, the disinfection unit comprises a housing that encloses a disinfection chamber that has: (a) a chamber wall; (b) a chamber inlet; (c) a chamber outlet; and (d) a UVC light source.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
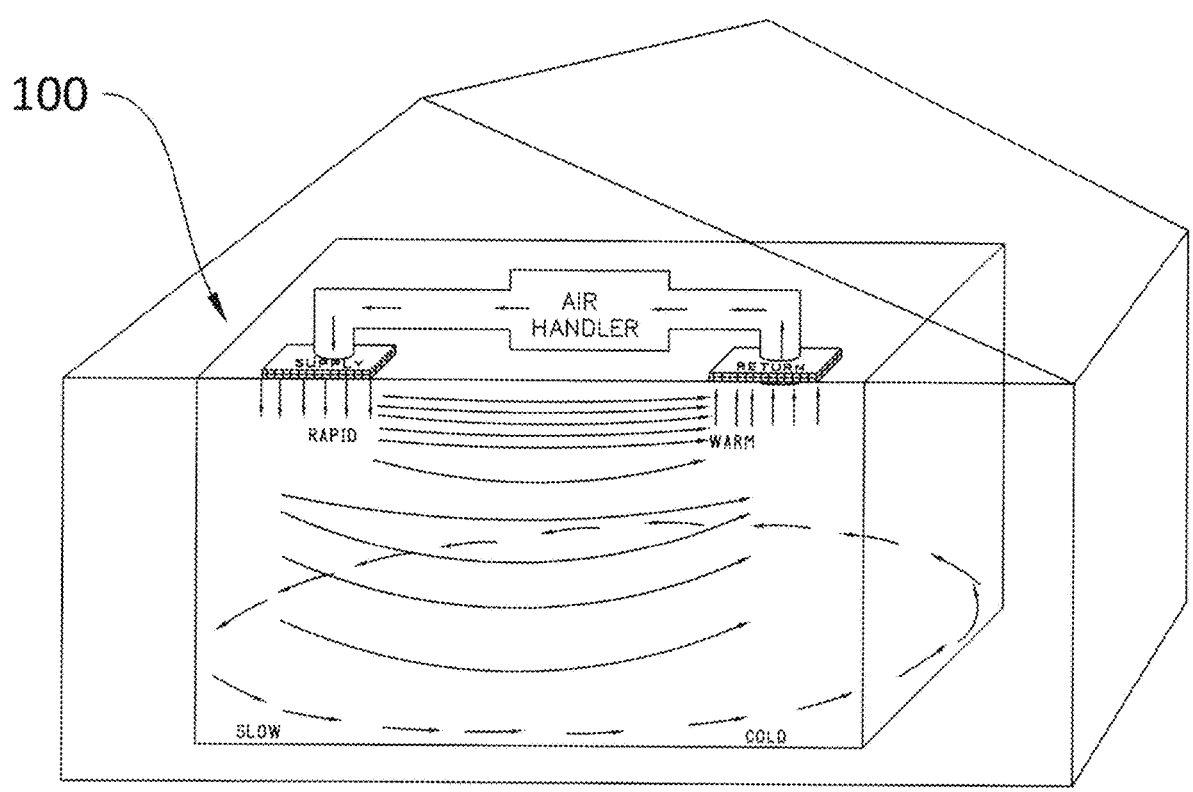
FIG. 1 illustrates a typical airflow pattern in a confined space having supply and return vents on the ceiling.
Figure 2A:
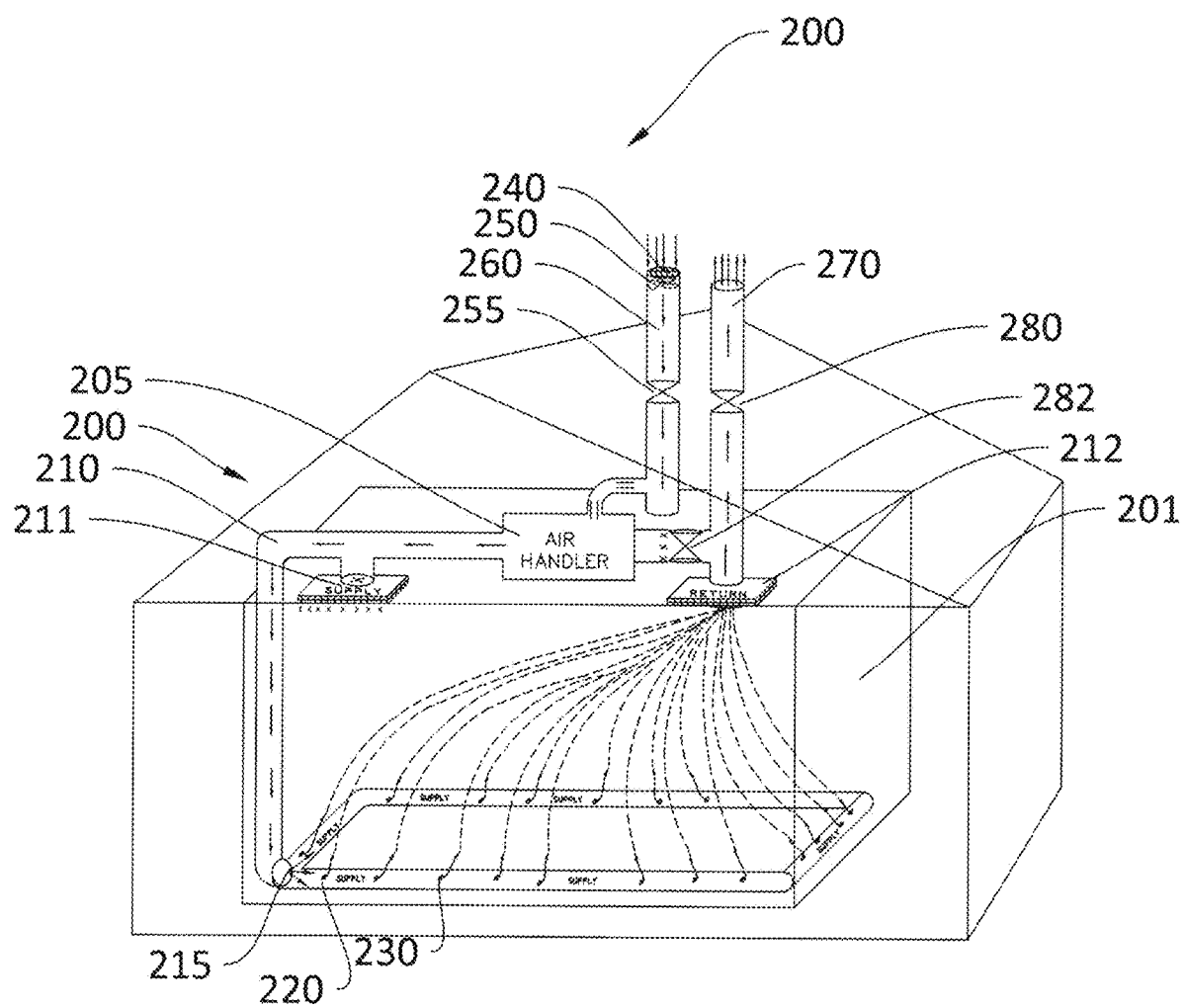
FIGS. 2A-2C illustrate a modified air delivery system according to an embodiment.

According to an embodiment, a modified air delivery system 200 for routing airflow within a confined space 201 is illustrated in FIG. 2. As shown, the system 200 is used to deliver fresh, chilled or hot air to the enclosure 201. As used hereinafter, the term "enclosure" can include any confined space, such as, a pavilion, a building, a room, a nursing home, an airplane, a train, a ship, a vehicle, a critical care unit in a hospital, and a free-standing, mobile enclosure. The system 200 comprises a fresh air intake pipe 260 for routing fresh air (shown as "arrows") from the atmosphere/outside to an air handler 205 of a central air conditioning system. The fresh air intake pipe 260 can also include a screen 240 for stopping unwanted matter including, leaves, insects, birds, pollen, etc. from entering the air handler 205. The screen 240 can include a filter, such as, a HEPA air filter. One or more fans 250 can be provided proximal to the screen 240 to suck air into the fresh air intake pipe 260. The fresh air intake pipe 260 further includes a bi-directional valve 255 which can be toggled between an open and closed position.

Filtered ambient air flows through the fresh air intake pipe 260 to the air handler 205. Conventional air handlers route conditioned air into a space through duct and vent 211. However, as shown in FIG. 2, according to an embodiment, the duct/vent 211 on the ceiling can be sealed by closing the it to ensure that no air flows out from it. Instead, conditioned air from the air handler 205 is supplied proximal to the ground level (also referred to herein as the bottom surface/floor) of the enclosure 201 through an alternate air supply duct 210. The alternate air supply duct 210 may be installed within the ceiling and walls of the enclosure 201. A first end of the alternate air supply duct 210 is coupled to the air handler 205. A second end of the alternate air supply duct 210 is coupled to a perimeter air duct 220. The conditioned air flows from the alternate air supply duct 210 to the perimeter air duct 220 through opening 215. The perimeter air duct 220 can be laid along/extends around the perimeter of the floor. The perimeter air duct 220 includes a plurality of openings/vents 230. The conditioned air—that is, cooled or heated air that has passed through the air handler—is supplied/delivered through the vents 230 which are located at or near the base of the enclosure 201.

Advantageously, the supplied air has to travel the entire height of the enclosure 201 before it is routed through a return vent 212 located at or proximal to the ceiling. Therefore, by incorporating the alternate air supply duct or ducts 210, 510 fresh and conditioned air can be routed to the ground level of the space 201.

The return vent 212 is connected to return duct 270. The return duct 270 is configured to route airflow from the enclosure 201 to the outside/atmosphere. The return duct 270 can include a pair of bi-directional valves 280 and 282. Valve 282 is located on a branch of the return duct, proximal to the air handler 205. Valve 282 can be configured to be in a closed position to prevent used/returned air from flowing into the air handler 205, however, it is opened when the valve 255 on fresh air intake pipe 260 is closed. When valve 282 is closed, the returned air flows from the enclosure 201 out to the atmosphere through the return duct 270. The valve 280 is opened to allow the used air to be vented to the atmosphere. However, it is understood that when valve 282 is opened, valve 280 is closed to maintain air pressure in the enclosure 201.

Under normal circumstances, the valve 255 on the fresh air intake pipe 260 and the valve 280 on the return duct are closed, and the valve 282 on a branch of the return duct remains open. Such an arrangement facilitates the recirculation of conditioned air in the space, however, as described earlier, the supplied air is forced to flow from the ground or floor level to the return vent on the ceiling. In exceptional circumstances, according to an embodiment, where an infected person is present in the enclosure 201, the valve 255 is opened for filtered ambient air to flow into the air handler 205 through the fresh air intake pipe 260. Also, the valve 282 remains closed and the valve 280 remains open for the used air to return to the atmosphere through the return duct 270. Thus, the system 200 ensures that the air supplied to the enclosure 201 through the alternate air supply duct 210 is substantially devoid of recirculated air and airborne microorganisms and is "totally clean" air conditioned or heated air.

Figure 2B:
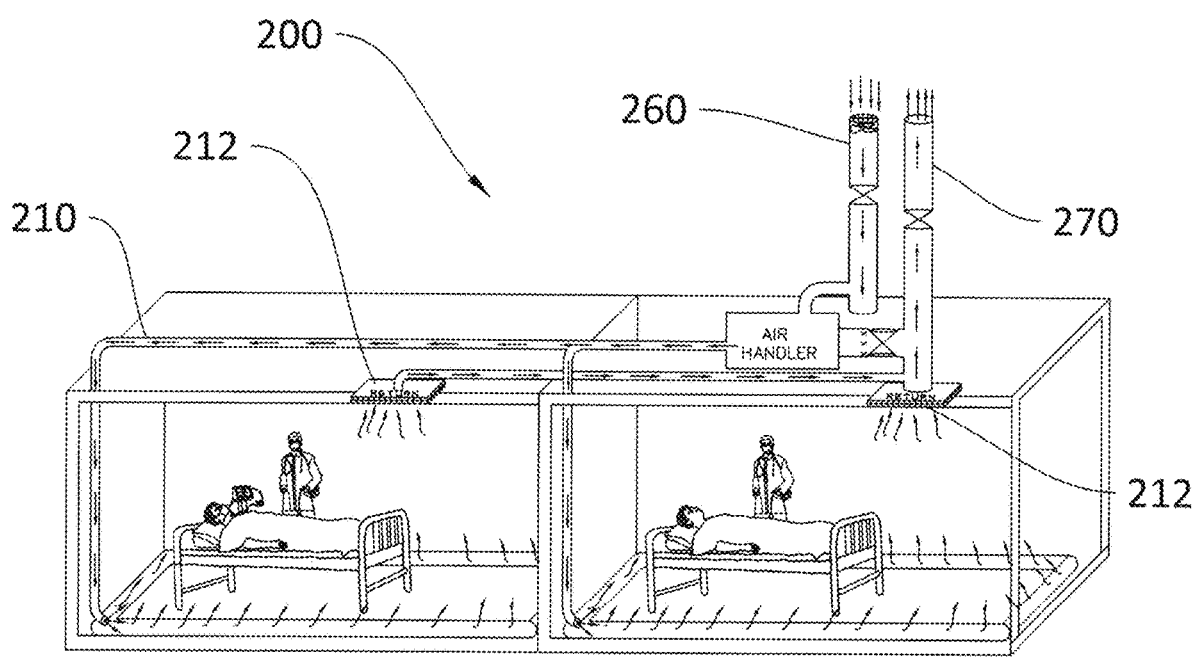

FIG. 2B illustrates an embodiment of system 200 that can be utilized in a single storied building or an enclosure with multiple rooms/partitioned spaces.

Figure 2C:
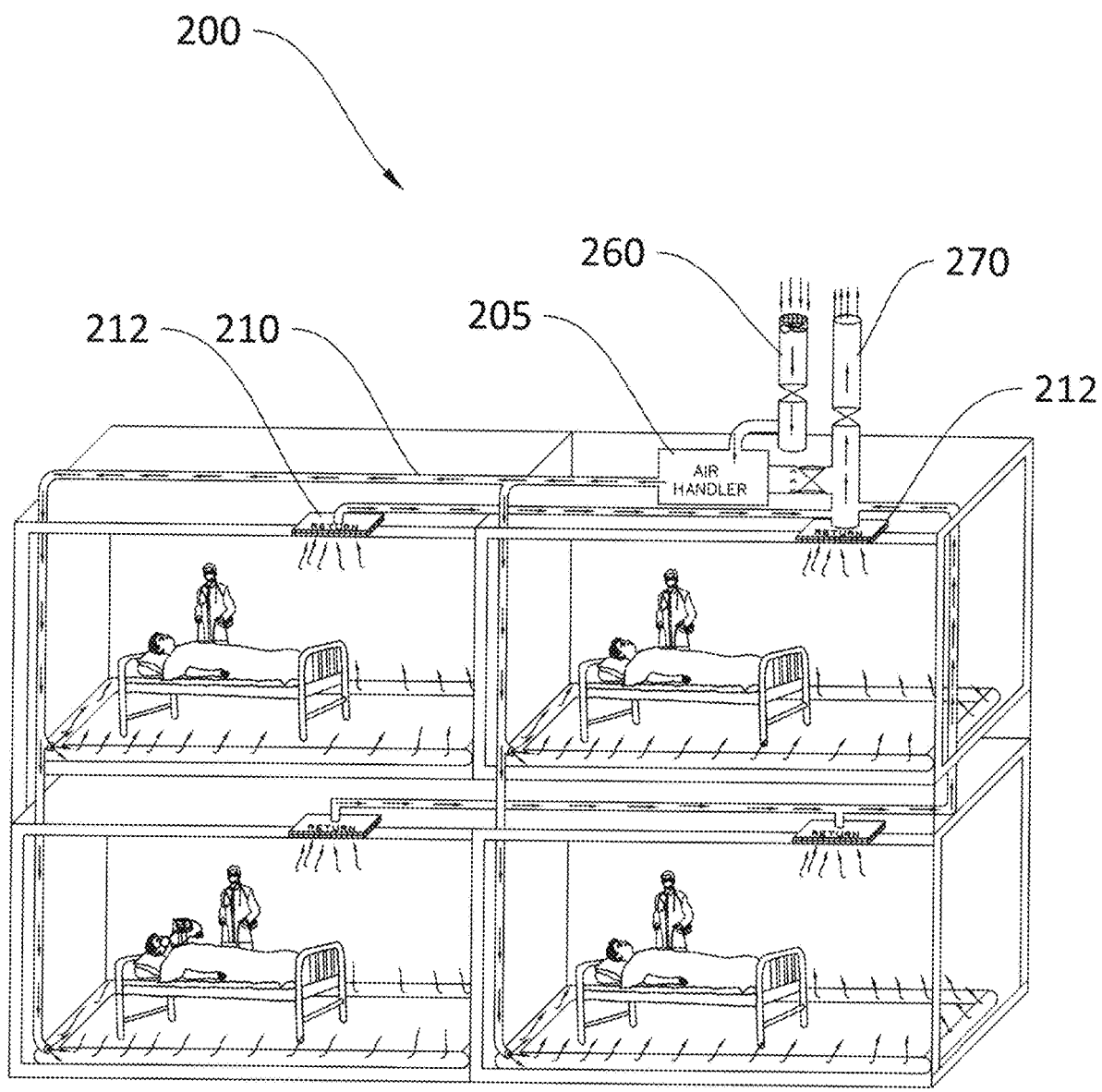

FIG. 2C illustrates an embodiment of system 200 that can be employed throughout a two/multi-storied building. Optionally, the system may contain a UVC disinfection unit between the air handler 205 and the air supply duct 210 and/or a UVC disinfection unit on the exhaust duct 270.

Figure 3A:
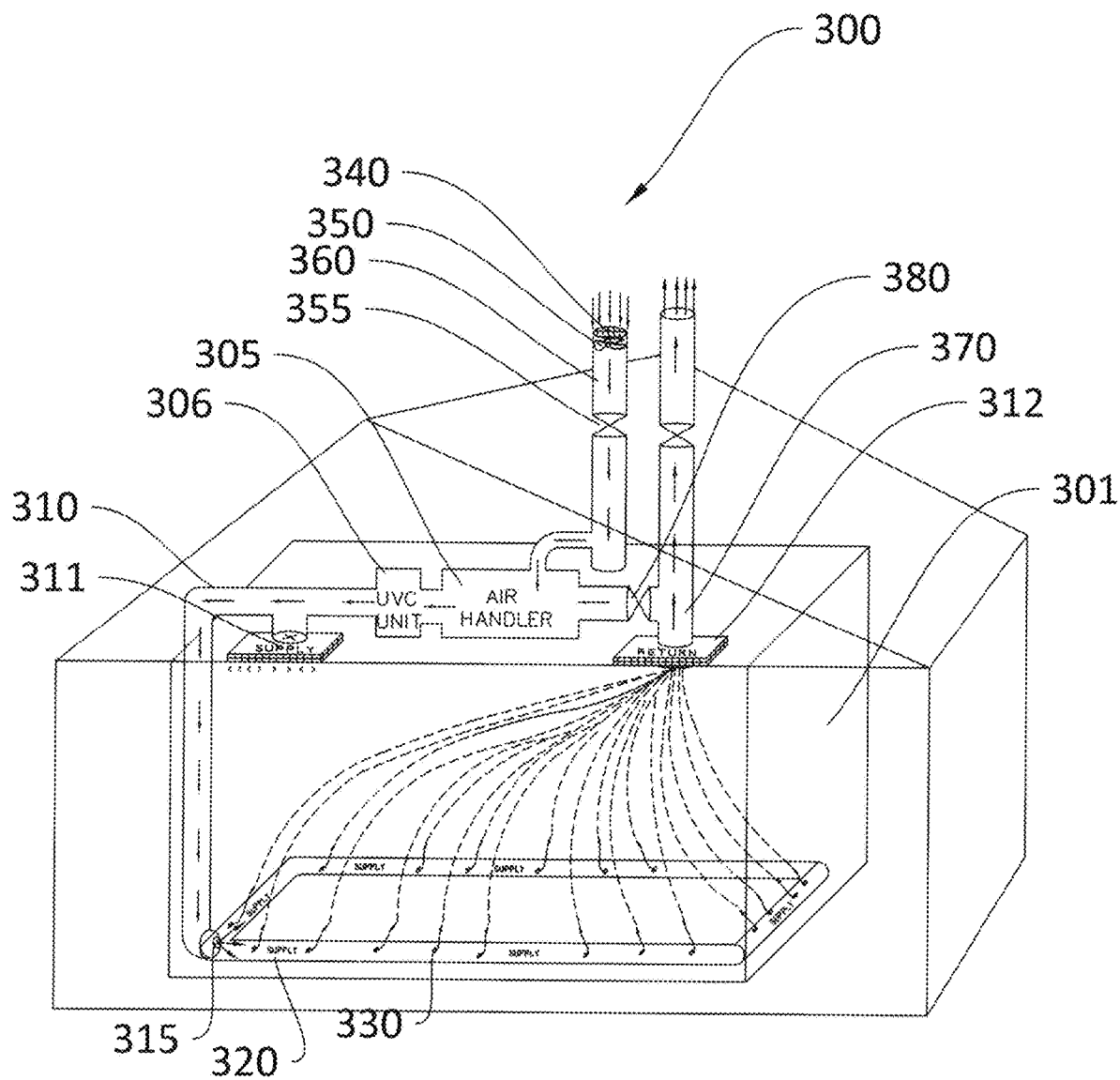
FIGS. 3A-3C illustrates a modified air delivery system with UVC disinfection according to another embodiment.
Figure 4A:
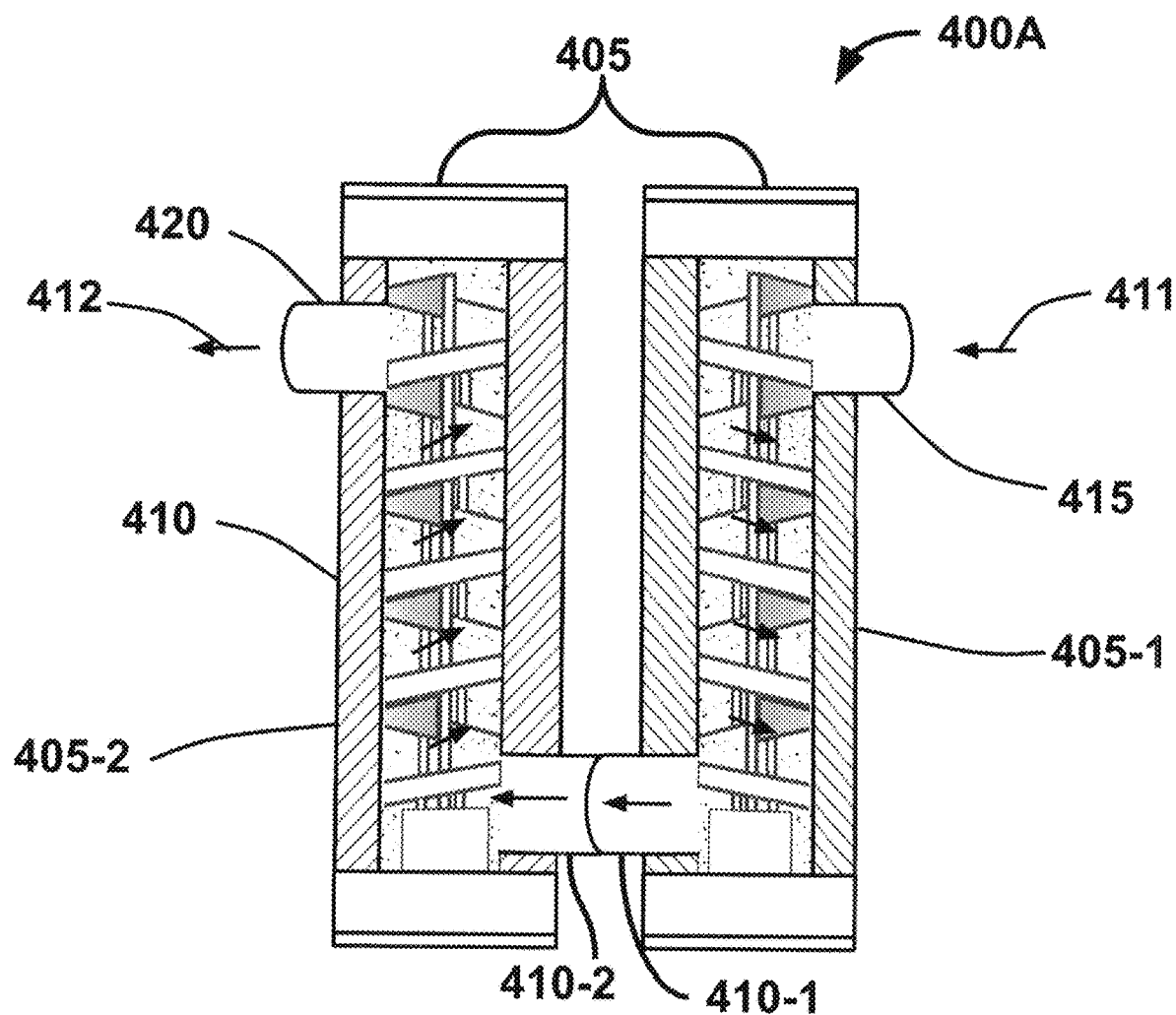
FIG. 4A illustrates an air disinfection unit according to an embodiment.
Figure 4B:
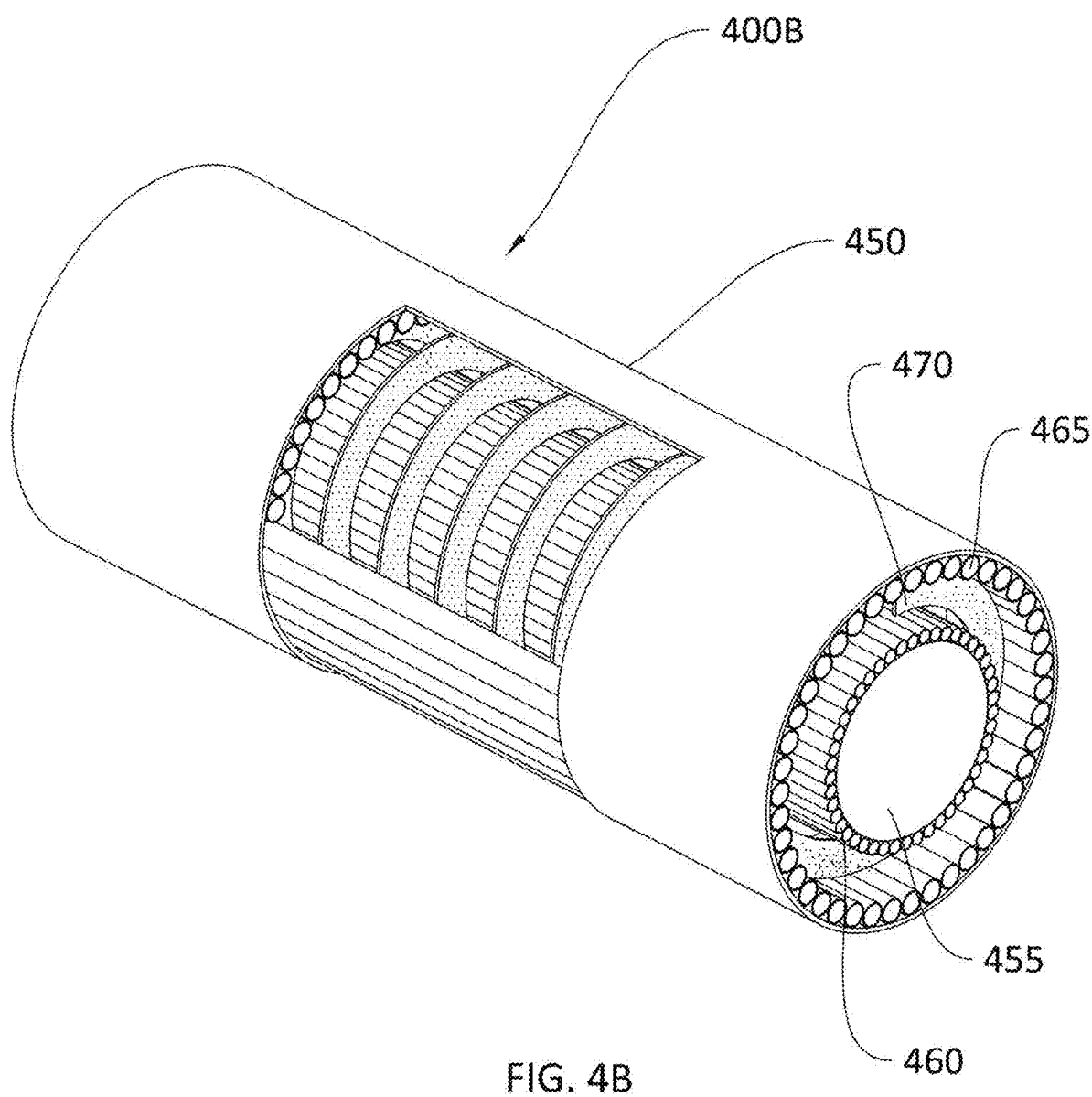
FIG. 4B illustrates an air disinfection unit according to another embodiment.

FIG. 3A illustrates another exemplary system 300 for a modified air delivery system. The system 300 is a self-cleaning, scavenging airflow having an air handler 305 connected to one or more UVC disinfection units/modules 306 (exemplary embodiments of UVC disinfection units are shown in FIGS. 4A and 4B). The system 300 can be located in a confined enclosure 301. The system 300 comprises a fresh air intake pipe 360 including a screen 340 for stopping unwanted matter including, leaves, insects, birds, pollen, etc. from entering the air handler and one or more fans 350 provided proximal to the screen 340 to suck air into the fresh air intake pipe 360. The screen 340 can include a filter, such as, a HEPA air filter. The fresh air intake pipe 360 further includes a bi-directional valve 355 which can be toggled between an open and close position. The bi-directional valve 355, in one embodiment, remains closed in order to prevent filtered ambient air from flowing into the air handler 305 through the fresh air intake pipe 360.

The system 300 includes the air handler 305 which is followed by the UVC disinfection unit 306 comprising a plurality of UV lights. In an embodiment, the incoming airflow into the disinfection unit 306 is configured to be routed along a serpentine pathway. The microorganisms in the airflow are exposed to the germicidal far UVC light produced by the light sources for an optimal duration resulting in their neutralization and/or destruction. The disinfected air is discharged to the AC ducts and delivered through supply vents 330 which are located at the floor level or substantially near the floor level in the enclosure 301.

A primary air supply duct and vent 311 on the ceiling of the confined space is closed or sealed, in the present invention, to ensure that there is no disinfected air flowing out from the supply vent 311 through the ceiling. Instead, disinfected air from the disinfection unit 306 is supplied proximal to the ground level of the enclosure 301 through a alternate air supply duct 310. The alternate air supply duct 310 may be installed within the ceiling and walls of the enclosure 301. A first end of the alternate air supply duct 310 is coupled to the disinfection unit 306. A second end of the alternate air supply duct 310 is connected to a perimeter air duct 320. The disinfected air flows from the alternate air supply duct 310 to the perimeter air duct 320 through opening 315. The perimeter air duct 320 is configured to extend around the perimeter of the floor of the space 301. The perimeter air duct 320 includes a plurality of openings/vents 330. The disinfected air is supplied through the vents 330 which are located at or near a ground level of the space 301. The vents 330 release disinfected heated/cooled air substantially at the ground level. The supplied air has to travel the entire height of the enclosure 301 before it is routed through a return vent 312 located at or near the ceiling.

According to one embodiment, the present invention involves a system for ensuring that the "used air", that is returned through the return vent 312, is fully or substantially recirculated to the enclosure 301 after complete disinfection of the "used air" to kill any air borne pathogens by UVC disinfection. The return vent 312 is connected to the air handler 305 through a return duct 370. The return duct 370 includes a bi-directional valve 380. According to an embodiment, the valve 380 remains opened in order to return the "used air" to the air handler 305 for disinfecting this used airflow.

This process not only improves the cooling/heating of the enclosure 301, but it can also transport microorganisms/pathogens settled in the floor of the enclosure 301 through the return duct 370 to the air handler 305 where it can be disinfected inside the disinfection unit 306. The UVC light in the disinfection unit can destroy/kill the pathogens. The air in the lower half of the enclosure 301 is completely swept out by the treated disinfected air coming out from the perimeter air duct 320 and constantly recirculated, resulting in a self-cleaning, scavenging airflow for air conditioners with incorporated UVC disinfection.

Figure 3B:
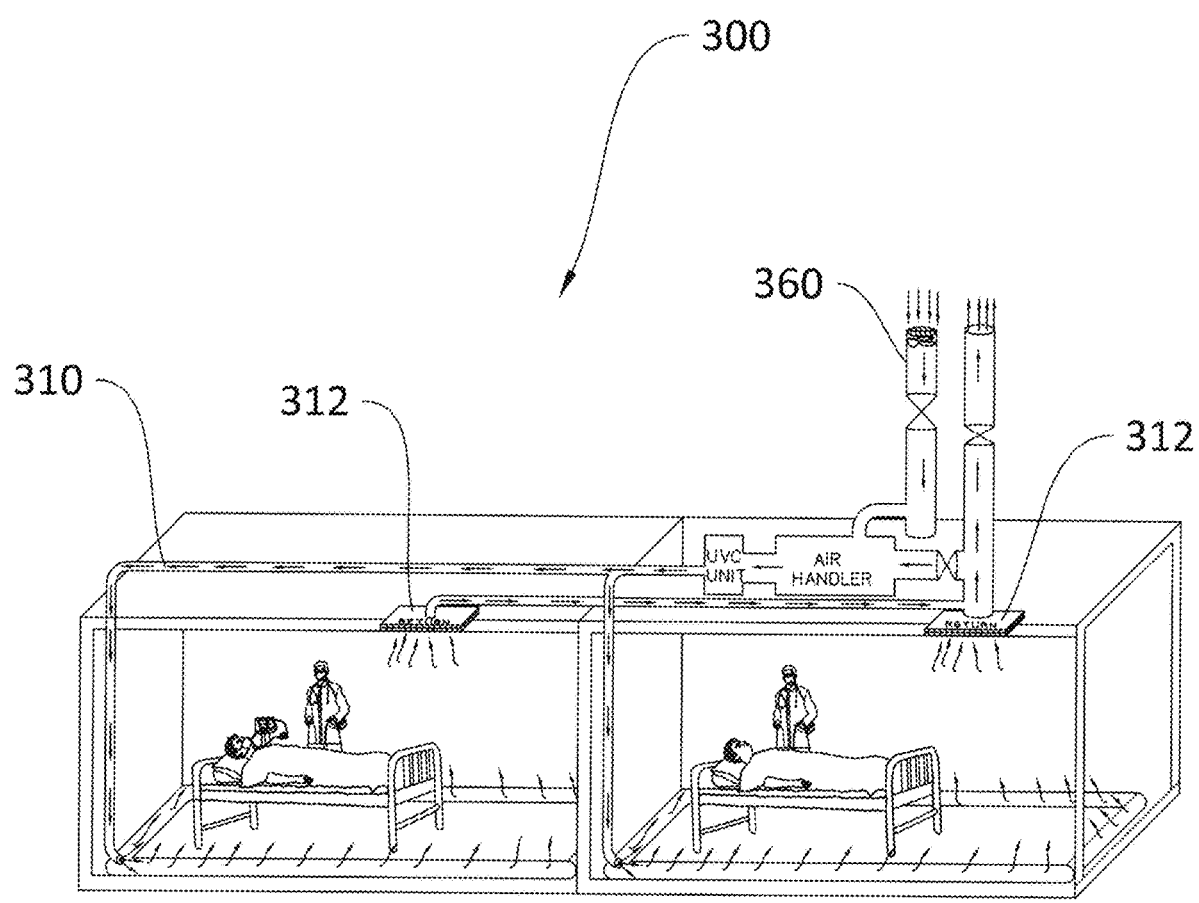
Figure 3C:
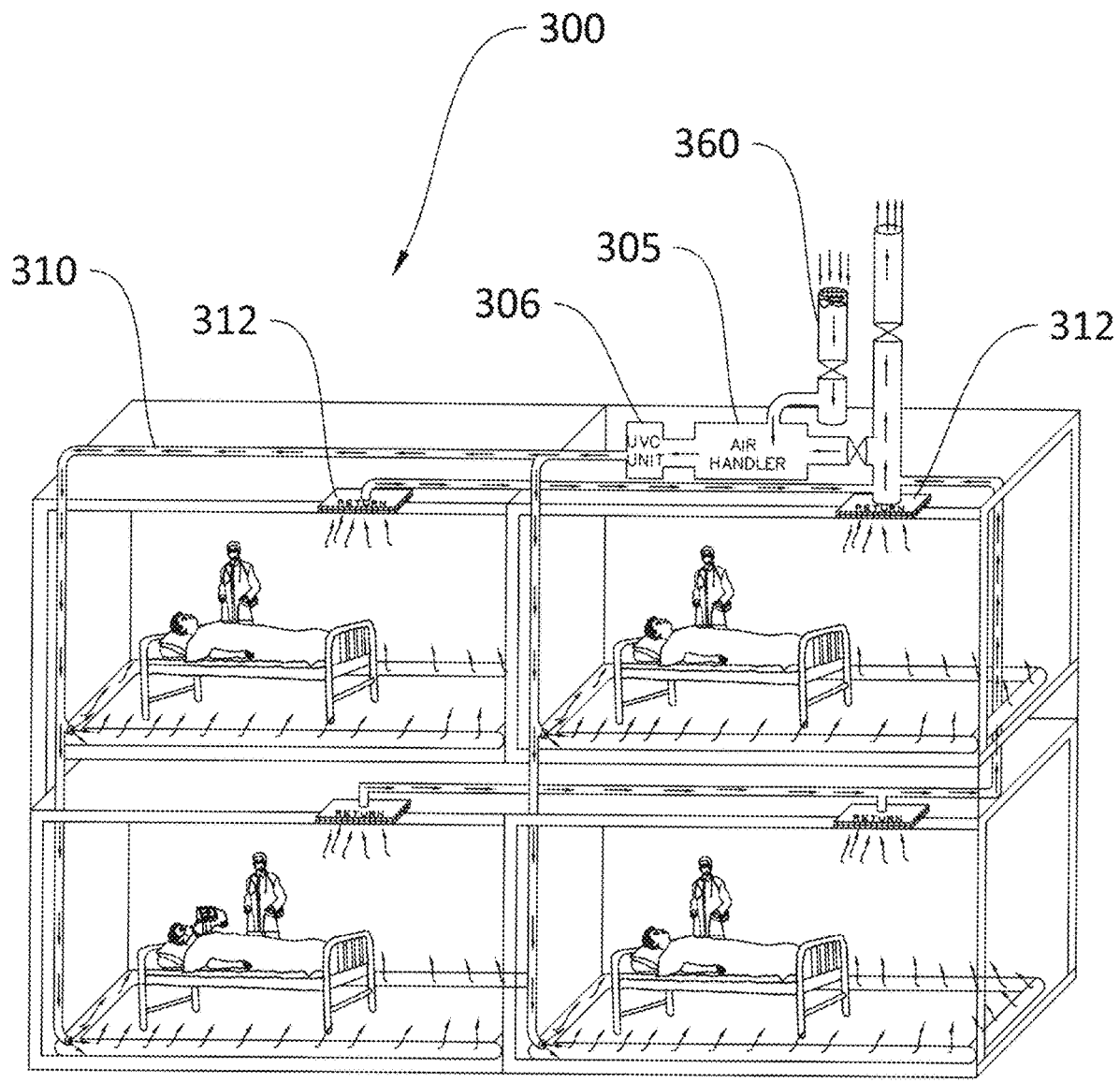

FIG. 3B illustrates one embodiment of how the system 300 can be employed in a one storied building, whereas FIG. 3C illustrates another embodiment of how the system 300 can be employed in a two storied building.

Figure 5:
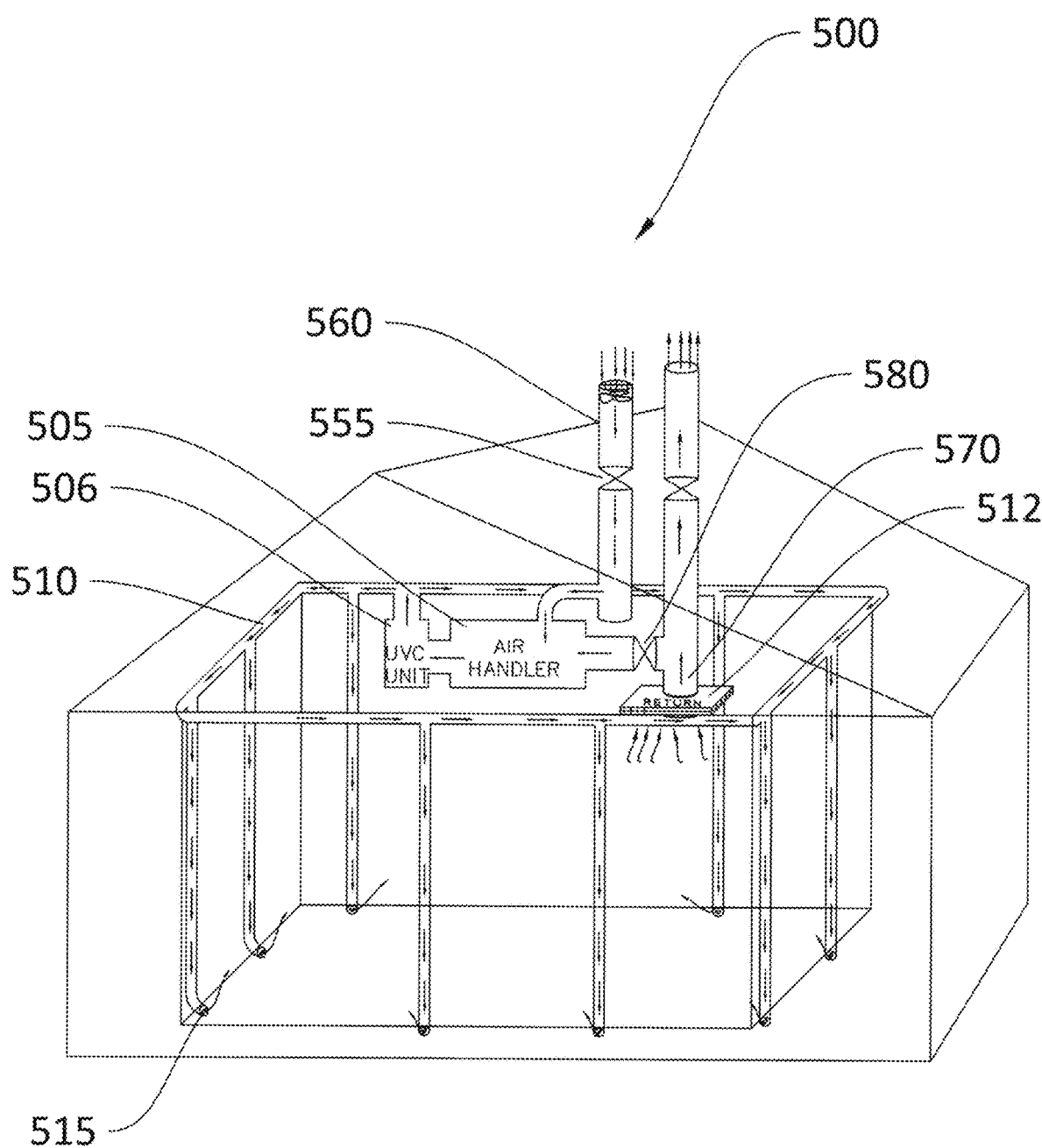
FIG. 5 illustrates a modified air delivery system with UVC disinfection according to yet another embodiment.

FIG. 5 illustrates an alternate embodiment of FIG. 3 where multiple air supply ducts 510 can be installed along the walls with individual openings 515 in the lower ends thereby avoiding the need for a perimeter air duct 220. The system 500, similar to that shown in FIG. 3, is employed within a confined enclosure 501. The system 500 comprises a fresh air intake pipe 560 including a screen for stopping unwanted matter including, leaves, insects, birds, pollen, etc. from entering the air handler and one or more fans provided proximal to the screen to suck air into the fresh air intake pipe. The screen can include a filter, such as, a HEPA air filter. The fresh air intake pipe further includes a bi-directional valve 555 which can be toggled between an open and close position. The bi-directional valve, in one embodiment, remains closed in order to prevent filtered ambient air from flowing into the air handler through the fresh air intake pipe.

The system 500 includes the air handler 505 which is followed by the disinfection unit 506. In an embodiment, the incoming airflow into the disinfection unit 506 is configured to be routed along a serpentine pathway within a housing of the disinfection chamber. The microorganisms in the airflow are exposed to the germicidal far UV-C light produced by the light sources for an optimal duration resulting in their neutralization. The disinfected air is discharged to branched air ducts 510 and delivered/supplied through duct vents 515 which are located at the floor level or substantially near the floor level in the room.

Figure 6:
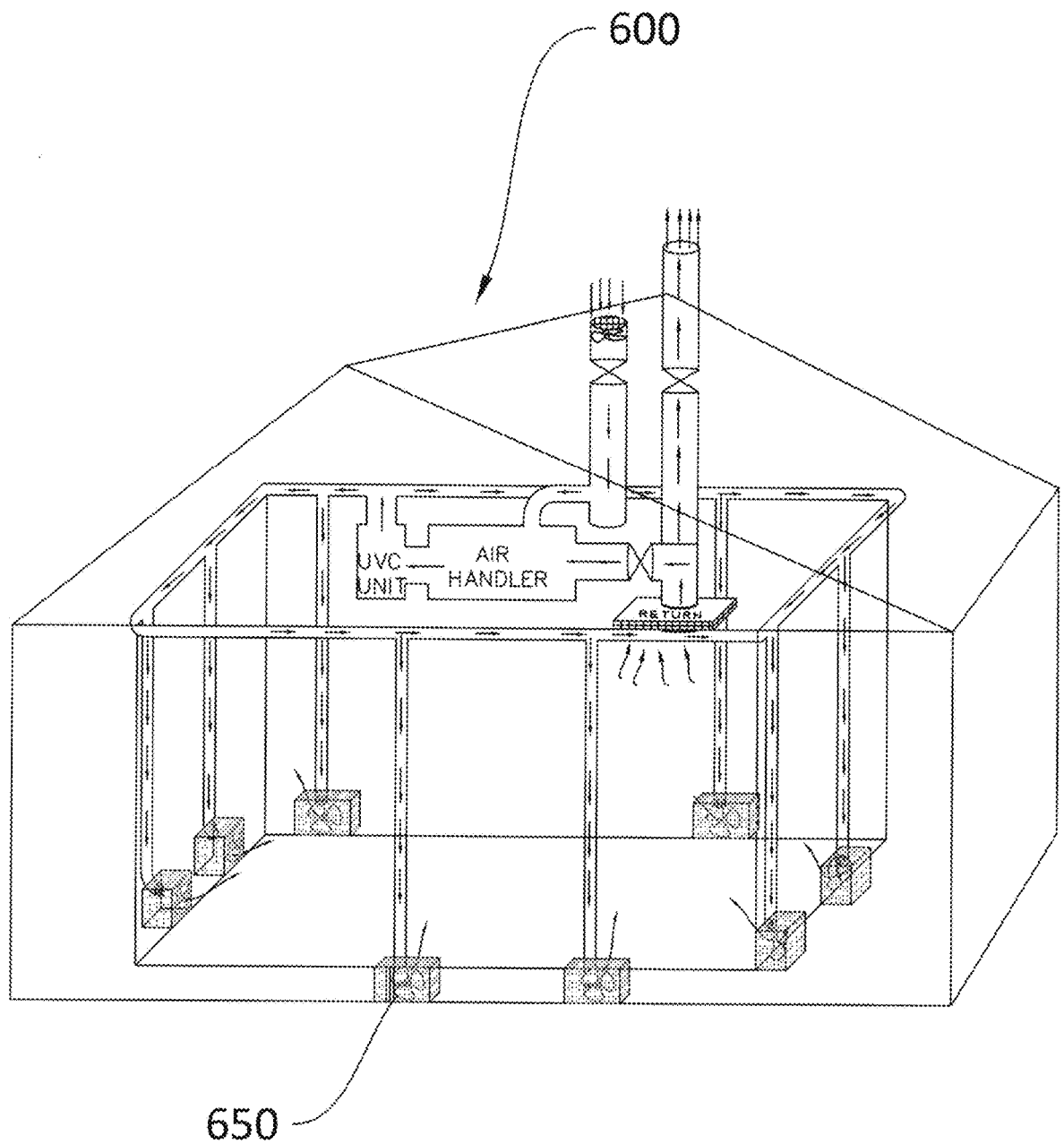
FIG. 6 illustrates a modified air delivery system with UVC disinfection according to another embodiment.

According to an embodiment, disinfected air from the disinfection unit 506 is supplied proximal to the ground level of the space 501 through a plurality of branched air supply ducts 510. The branched ducts 510 may be installed within the ceiling and walls of the enclosure 501. A first end of the air supply ducts 510 is coupled to the UVC chamber 506 containing UV-C light source(s). The disinfected air flows from the air supply ducts 510 into the enclosure 501 through air supply vents 515. The vents 515 release heated/cooled air substantially at the ground level. The supplied air has to travel the entire height of the enclosure 501 before it is routed through a return vent 512 located at or near the ceiling. FIG. 6 illustrates a system 600 similar to the system 500 shown in FIG. 5 but with a fan 650 attached to each vent 515 (not shown). Such fans can help to ensure better circulation of the conditioned air throughout the enclosure.

According to one embodiment, the present invention involves a system for ensuring that the "used air", that is returned through the return vent 512, is recirculated to the enclosure 501 after complete disinfection of the "used air" to kill possible pathogens using the disinfection unit 506. The return vent 512 is connected to the air handler 505 through a return duct 570. The return duct 570 includes a bi-directional valve 580. The valve 580 remains opened in order to return the "used air" to the air handler 505 for disinfecting the airflow.

This process improves the cooling/heating of the confined space but it can also transport microorganisms settled in the floor of the space 501 through the return duct 570 to the air handler 505 where it can be disinfected inside the disinfection unit 506 to destroy/kill the pathogens. The air in the lower half of the enclosure 501 is completely swept out by the treated, disinfected air coming out from the plurality of air supply ducts 510 and constantly recirculated, resulting in a self-cleaning, scavenging airflow for air conditioners with incorporated UVC disinfection.

Figure 7:
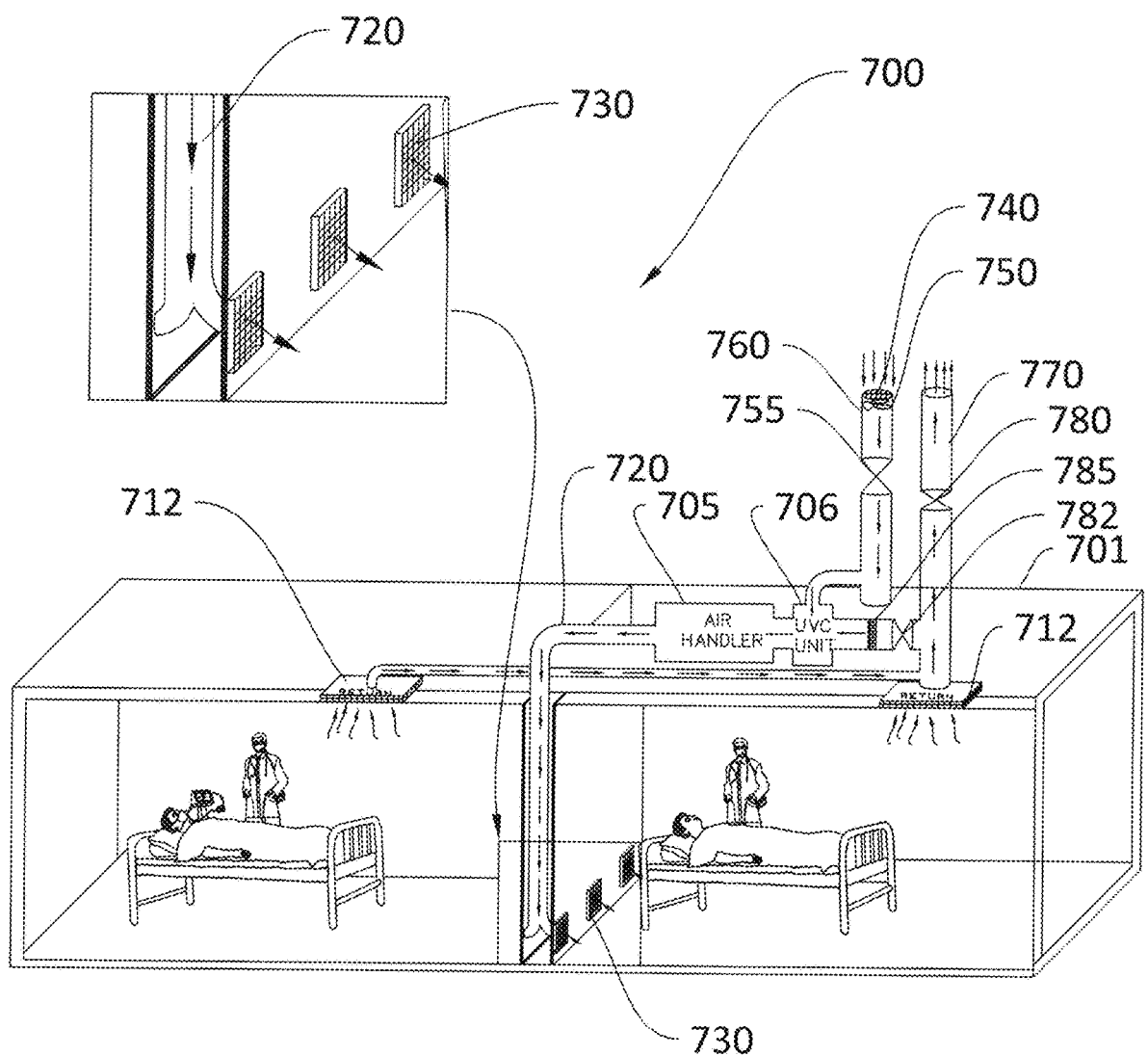
FIG. 7 illustrates yet another embodiment of the modified air delivery system showing a detailed view of the air handler and UV-C disinfection unit including a wall duct that routes air from the ceiling level to the ground level.

FIG. 7 illustrates an embodiment of an air delivery system 700 showing a detailed view of the air handler and UV-C disinfection unit in an enclosure 701 having two or more rooms or partitioned spaces, wherein the system includes a wall duct that is configured to route air from the ceiling level to the ground level.

In this embodiment, ambient air enters through fresh air intake pipe 760. Air intake pipe 760 can also include a screen 740 for stopping unwanted matter including, leaves, insects, birds, pollen, etc. from entering the air handler 705. The screen 740 can include a filter, such as, a HEPA air filter. One or more fans 750 can be provided proximal to the screen 740 to suck air into the fresh air intake pipe 760. The fresh air intake pipe 760 further includes a bi-directional valve 755 which can be toggled between an open and closed position.

The air is transported to a disinfection unit 706 where it is exposed to UV-C light to neutralize airborne pathogens, such as bacteria and viruses. The disinfected air is routed to an air handler 705 of an air conditioner where it can be heated or cooled. The conditioned air can be routed through air supply duct 720, which is installed from the ceiling within the walls of the enclosure 701. The air supply duct 720 can be configured to bifurcate and to branch out proximal to the floor of the enclosure 701 such that one branch delivers conditioned air to one room while a second branch can deliver conditioned air to an adjacent room with one or more air vents 730 located proximal to the floor of both rooms. This configuration ensures that the conditioned and disinfected air circulates effectively from the floor upwards, improving air quality and preventing stagnant air from remaining at the lower levels of the enclosure. The figure emphasizes the internal components and operation of the air handler and UV-C disinfection process in this self-cleaning airflow system.

Exhaled air in each room is routed through ceiling vents 712 and discharged to the atmosphere through return duct 770. The return duct 770 can include a pair of bi-directional valves 780 and 782. Valve 782 is located on a branch of the return duct, proximal to the disinfection unit 706. Valve 782 can be opened when patients suffering from infectious diseases are being treated in the enclosure 701, such that the returned (infected) air is routed to the disinfection unit 706 for treatment before it is routed back to the rooms. A filter, such as a HEPA filter or the like, 785 can be included in the circuit. The valve 780 is closed when valve 782 is opened to maintain air pressure in the enclosure 701.

Figure 8:
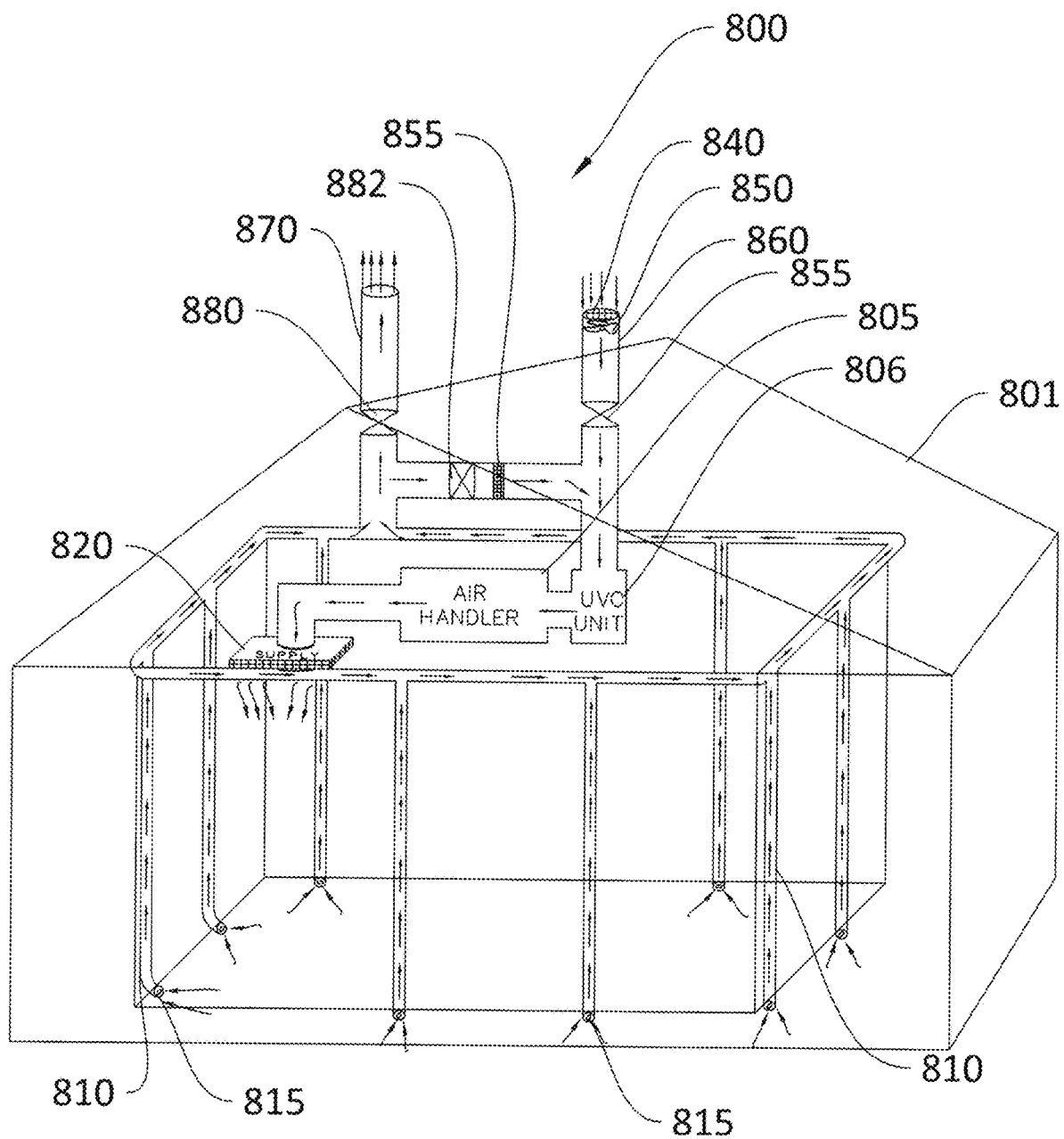
FIG. 8 illustrates another embodiment of the modified air delivery system configured for use in a multi-zone or larger building where the air is delivered from the ceiling level and taken back to the air handler at the ground level.

FIG. 8 illustrates another embodiment of an air flow delivery system 800 configured for use in a larger or multi-zone building where the air is delivered from the ceiling level and taken back to the air handler at the ground level.

This embodiment demonstrates the scalability of the system, incorporating multiple UV-C disinfection units and air handlers to handle greater airflow requirements. In this embodiment, ambient air enters through fresh air intake pipe 860. Air intake pipe 860 can also include a screen 840 for stopping unwanted matter including, leaves, insects, birds, pollen, etc. from entering the air handler 805. The screen 840 can include a filter, such as, a HEPA air filter. One or more fans 850 can be provided proximal to the screen 840 to suck air into the fresh air intake pipe 860. The fresh air intake pipe 860 further includes a bi-directional valve 855 which can be toggled between an open and closed position.

The air is transported to a disinfection unit 806 where it is exposed to UV-C light to neutralize airborne pathogens, such as bacteria and viruses. The disinfected air is routed to an air handler 805 of an air conditioner where it can be heated or cooled. The conditioned air can be routed through air supply duct 820 to vents which are installed on (or close to) the ceiling of the enclosure 801. Thus, in this embodiment, air is supplied from (or close to) the ceiling of the enclosure.

The system 800 includes a return air duct 810 having a plurality of branches. The branches extend through the walls of the enclosure 801. Each branch terminates in a vent or opening 815 proximal to the floor of the enclosure 801. Exhaled/used air is routed through openings 815 into the return air duct 810 and discharged to the atmosphere through duct 870. The duct 870 can include a pair of bi-directional valves 880 and 882. Valve 882 can be opened when patients suffering from infectious diseases are being treated in the enclosure 801, such that the returned (infected) air is routed to the disinfection unit 806 for treatment before it is routed back to the enclosure 801. A filter similar to HEPA filters, 855 can be included in the circuit. The valve 880 is closed when valve 882 is opened to maintain air pressure in the enclosure 801.

Exemplary air disinfection units (for use in the various embodiments of the air delivery system described herein) are disclosed in U.S. Ser. No. 18/328,463, the content of which is incorporated herein by reference in its entirety. An exemplary embodiment of an air disinfection unit 400A is illustrated in FIG. 4A. The air disinfection unit 400A has one or more modules 405-1, 405-2 ("405"). A first module 405-1 includes a housing having an air inlet 415 and a housing outlet 410-1. A second module 405-2 is connected in series to the first module 405-1. Housing outlet 410-1 is connected to housing outlet 410-2 of the second module 405-2. The connection may be in the form of bellows, so that the air from one module does not go out into the ambient air but is forced to go into the next module. The air inlet 415 allows ambient/incoming air 411 to enter the air disinfection unit 400A and the disinfected air 412 exits out the air outlet 420. The disinfection unit 400A can be expanded by increasing the number of UV disinfection units/modules 405. The disinfection unit 400A can include a plurality of ultraviolet lights.

In another embodiment, disinfection unit 400B can be used to disinfect air-conditioned airflow. As shown, the disinfection unit 400B includes a substantially cylindrical outer housing 450. The disinfection unit 400B further includes a cylindrical inner housing 455 that is positioned centrally within a cavity formed within the outer housing 450. The inner cylinder 455—which may be a solid/rod-like structure—extends the length of the outer housing 450. A plurality of UV light sources 470 is affixed around an outer surface of the inner cylinder while a plurality of UV lights 465 is affixed to an inner surface of the outer housing. The UV light sources 460, 465 are configured to emit germicidal far UV-C light. An airflow divertor 470 is positioned in the space between the UV light sources 460 and 465. The airflow diverter 470 is substantially spiral or helical. The airflow diverter 470 is configured to create a serpentine airflow pathway for the incoming (untreated) airflow such that any microorganisms in the air are exposed to the far UV-C lights for a substantially long period. The length and diameter of the housing 450 and the distance between each spiral turn of the airflow diverter 470 can be increased or decreased to increase or slow the passage of the airflow to be disinfected. The disinfection units, as shown in FIGS. 4A and 4B, can be incorporated within an existing air-conditioning system.

It is understood that the enclosure can have multiple ducts and vents, and all such embodiments are within the scope of the present invention. Furthermore, the components of conventional air conditioning systems (such as, air handlers/evaporators/blowers/furnaces, condensers, etc.) are well known in the art and have not been reiterated herein.

The many features and advantages of the invention are apparent from the written description and, thus, to cover all such features and advantages of the invention. Accordingly, all suitable modifications and equivalents may be resorted to as falling within the scope of the invention.

I claim:

1. An air flow delivery system for delivering conditioned air to an enclosure, comprising:
    (a) an air intake pipe having a first bidirectional valve therein, wherein when the bidirectional valve is in an open state, ambient air enters the enclosure, and wherein when the bidirectional valve is in a closed state, ambient air is prevented from entering the enclosure;
    (b) an air handler, the air handler coupled to the air intake pipe; and
    (c) a sealed ceiling vent; and
    (d) an air supply duct installed within at least one wall of the enclosure, wherein the air supply duct delivers conditioned air from the air handler to one or more air supply vents positioned at or near a bottom surface of the enclosure.

2. The system as claimed in claim 1, wherein the air intake pipe includes a filter therein.

3. The system as claimed in claim 1, wherein the air intake pipe includes a fan therein.

4. The system as claimed in claim 1, wherein a first end of the air supply duct is coupled to the air handler.

5. The system as claimed in claim 4, wherein a second end of the air supply duct is coupled to a perimeter air duct, wherein the perimeter air duct extends around the perimeter of the bottom surface of the enclosure.

6. The system as claimed in claim 5, wherein the one or more air supply vents are arranged along the perimeter duct.

7. The system as claimed in claim 1, further comprising one or more return vents located at or proximal to a ceiling of the enclosure.

8. The system as claimed in claim 7, further comprising a return duct for routing used air from the enclosure, wherein the return duct is connected to the one or more return vents.

9. The system as claimed in claim 8, wherein the return duct further comprises a pair of bi-directional valves.

10. The system as claimed in claim 9, wherein when a first valve is moved to an open position, it allows used air to re-enter the air handler, and wherein when the first valve is moved to a closed position, it blocks air from re-entering the air handler.

11. The system as claimed in claim 1, further comprising a disinfection unit, wherein the disinfection unit is configured to emit ultraviolet-C germicidal light, and wherein the disinfection unit is coupled to the air handler.

12. The system as claimed in claim 11, wherein a first end of the air supply duct is coupled to the disinfection unit.

13. The system as claimed in claim 12, wherein a second end of the air supply duct is coupled to a perimeter air duct, wherein the perimeter air duct extends around the perimeter of the bottom surface of the enclosure.

14. The system as claimed in claim 13, wherein the one or more air supply vents are arranged along the perimeter duct.

15. The system as claimed in claim 12, wherein the air supply duct further comprises a plurality of duct branches, and wherein each duct branch terminates in an air supply vent.

16. The system as claimed in claim 15, further comprising a plurality of fans, and wherein each fan is coupled to an air supply vent.

17. The system as claimed in claim 1, wherein the enclosure is selected from a group consisting of a pavilion, a building, a room, a nursing home, an airplane, a vehicle, a train, a ship, a critical care unit in a hospital, and a free-standing, mobile enclosure.

* * * * *